United States Patent [19]

Ishigaki et al.

[11] 4,020,409
[45] Apr. 26, 1977

[54] RECTIFYING AND SMOOTHING CIRCUIT

[75] Inventors: Yukinobu Ishigaki, Yamato; Kohei Sasamura, Sagamihara, both of Japan

[73] Assignee: Victor Company of Japan, Limited, Japan

[22] Filed: Dec. 24, 1975

[21] Appl. No.: 644,169

[30] Foreign Application Priority Data

Dec. 27, 1974 Japan .......................... 49-148934

[52] U.S. Cl. .................................................. 321/10
[51] Int. Cl.² ...................................... H02M 1/14
[58] Field of Search .......... 321/9, 10, 47; 307/237, 307/260; 330/138, 140; 333/79

[56] References Cited
UNITED STATES PATENTS

| | | | |
|---|---|---|---|
| 3,090,017 | 5/1963 | Novic | 321/10 X |
| 3,196,291 | 7/1965 | Woodwad | 321/2 |
| 3,510,753 | 5/1970 | Lawn | 321/10 X |

*Primary Examiner*—William M. Shoop

[57] ABSTRACT

A rectifying and smoothing circuit comprises a first rectifier for rectifying an input signal voltage, a first smoothing circuit for smoothing the output voltage of the first rectifier, an attenuation circuit for attenuating the output voltage of the first smoothing circuit, a second rectifier for rectifying voltage passing through the attenuation circuit, a second smoothing circuit for smoothing the output voltage of the second rectifier, and a feedback circuit for feeding back the output voltage of the second smoothing circuit to the first smoothing circuit, the second smoothing circuit, after being charged at a specific voltage, is held at said charging voltage until the output voltage of the first smoothing circuit becomes less than the output voltage of the second smoothing circuit, the output voltage of the second smoothing circuit being derived as the output of the rectifying and smoothing circuit.

4 Claims, 13 Drawing Figures

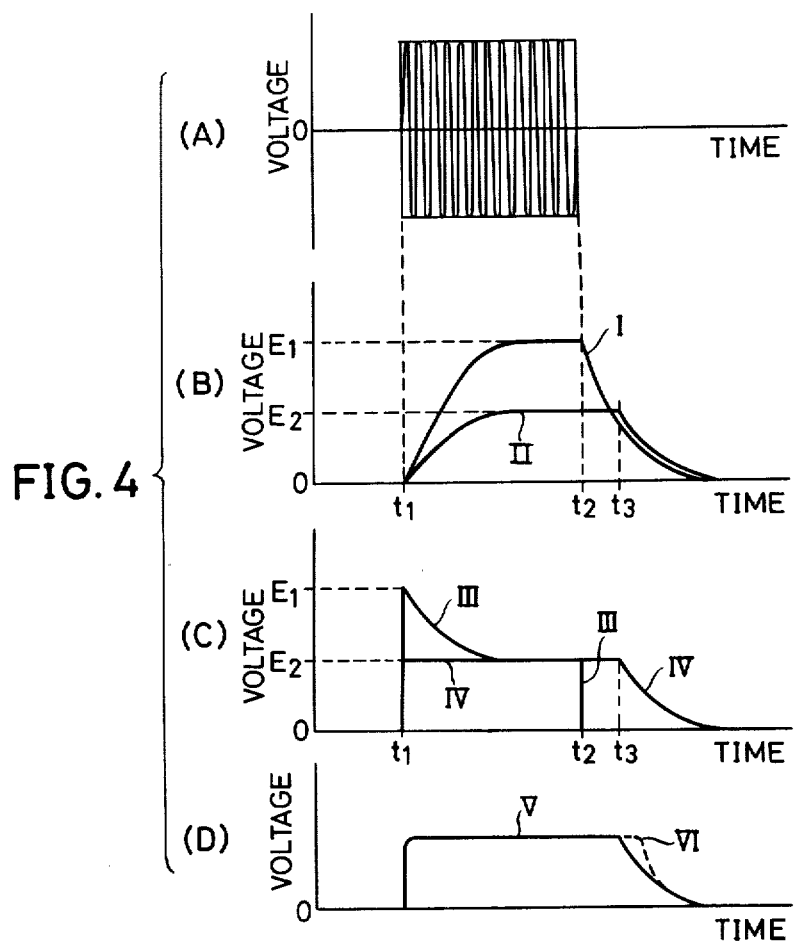
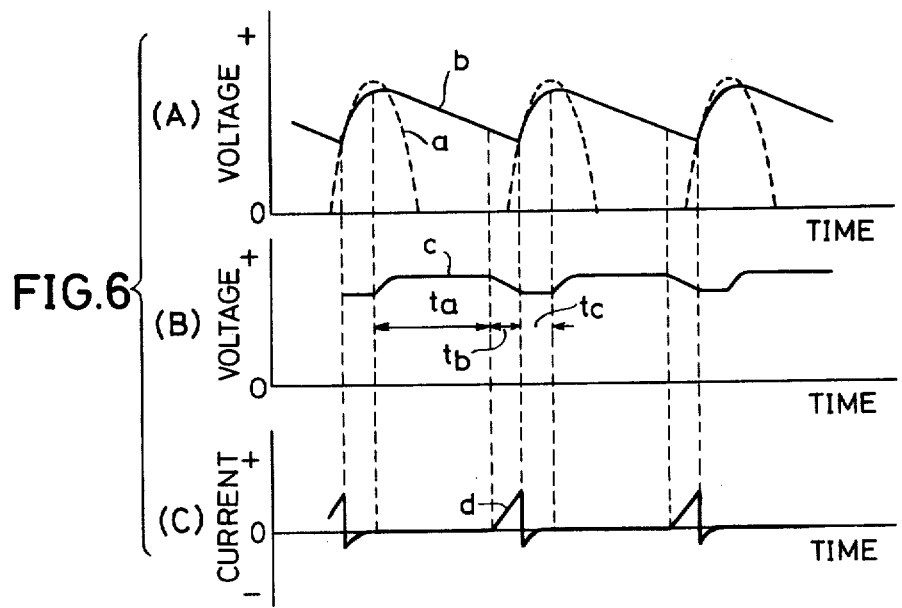

RECTIFYING AND SMOOTHING CIRCUIT

BACKGROUND OF THE INVENTION

The present invention relates generally to rectifying and smoothing circuits and more particularly to a rectifying and smoothing circuit of rectifying and smoothing with good response characteristic and, moreover, with little ripple.

In a known rectifying and smoothing circuit, its output contains a large ripple component. This ripple content increases with decreasing frequency and with increasing input level. In the case where a rectifying and smoothing circuit of such large ripple component is used as a circuit for obtaining a control voltage for a voltage-controlled, variable-gain amplifier circuit, the gain of the variable-gain, amplifier circuit is controlled by the ripple, and the output signal thereof aquires a great distortion.

Accordingly, in order to reduce this ripple component, it is necessary to cause the rectifying and smoothing circuit to possess an amply large time constant with respect to the low frequency band of a signal to be rectified. However, when the time constant is made amply large in this manner, the response characteristic of the rectifying and smoothing with respect to an input signal becomes poor.

In the known rectifying and smoothing circuits, therefore, it has been almost impossible to accomplish rectifying and smoothing with small ripple component in the output signal and, moreover, with good response characteristic.

SUMMARY OF THE INVENTION

Accordingly, it is a general object of the present invention to provide a novel and useful rectifying and smoothing circuit in which the above described difficulties are overcome.

Another and more specific object of the invention is to provide a rectifying and smoothing circuit capable of accomplishing rectifying and smoothing with small ripple component in the output signal. Since the ripple component in the output is small in the rectifying and smoothing circuit of the invention, in the case where this circuit is used in an automatic gain control system wherein a voltage-controlled, variable-gain amplifier circuit is used, low-distortion gain control can be carried out. Furthermore, the circuit of this invention is also applicable to audio limiters, noise reducing systems for audio signals, and other automatic gain control means.

Still another object of the invention is to provide a rectifying and smoothing circuit capable of accomplishing rectifying and smoothing with little ripple component and, moreover, with good response characteristic.

Other objects and further features of the invention will be apparent from the following detailed description when read in conjunction with the accompanying drawings.

BRIEF DESCRIPTION OF THE DRAWINGS

In the drawings:

FIGS. 4(A), 4(B), 4(C) and 4(D) are time charts respectively indicating signal waveforms at certain parts of the circuit shown in FIG. 3;

FIGS. 6(A), 6(B), and 6(C) are time charts respectively indicating signal waveforms at certain parts of the circuit illustrated in FIG. 5;

DETAILED DESCRIPTION

Figure 1:
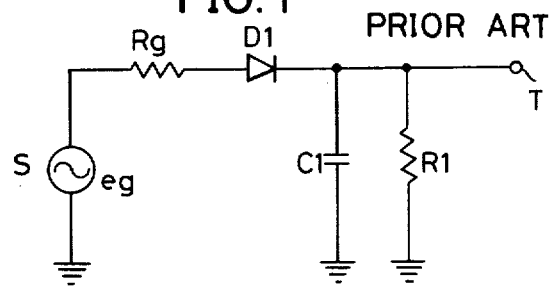
FIG. 1 is a circuit diagram of one example of a known rectifying and smoothing circuit.
Figure 2:
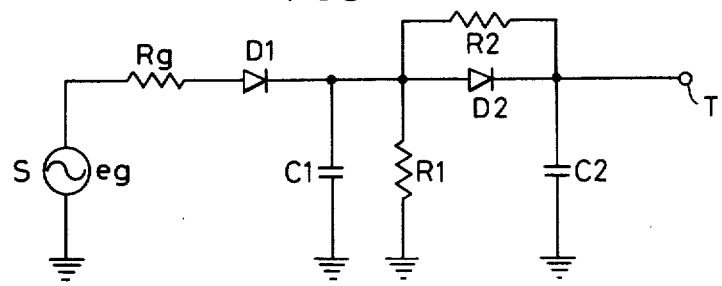
FIG. 2 is a circuit diagram of another example of a known rectifying and smoothing circuit.

As conducive to a full understanding of the present invention, examples of known rectifying and smoothing circuits will be briefly considered with reference to FIGS. 1 and 2. Referring to FIG. 1, a signal eg from a signal source S passes through a signal source resistor Rg and, after undergoing half-wave rectification by a diode D1 is charged into a capacitor C1. The charging time constant of this circuit is determined by the signal source resistor Rg, the internal resistance Rd1 of the diode D1, and the capacitance value of the capacitor C1. When the recitification signal voltage from the diode D1 becomes less than the charging voltage level of the capacitor C1, the diode D1 is, in effect, inversely biased, and the charge in the capacitor C1 is discharged through a resistor R1. The discharging time constant of this circuit is determined by the capacitance value of the capacitor C1 and the resistance value of the resistor R1.

As the capacitor C1 is charged and discharged, a rectified and smoothed voltage is obtained through an output terminal T. This output voltage contains a considerably large ripple component. This ripple quantity depends on the value of the above mentioned charging and discharging time constant. Moreover, this ripple quantity increases with a slope 6dB/oct with decreasing signal frequency.

In another example of a rectifying and smoothing circuit of the prior art as shown in FIG. 2, a signal which has been half-wave rectified by a diode D1 charges a capacitor C1 and, at the same time, charges instantaneously by way of a diode D2 into a capacitor C2. At this time, a resistor R2 connected in parallel to the diode D2 is caused by the diode D2 to assume a short-circuited state. The charging time constant is determined, as an instantaneous value, by the signal source resistor Rg, the internal resistance Rd1 of the Diode D1, the capacitance of the capacitor C1, the internal resistance Rd2 of the diode D2, and the capacitance of the capacitor C2.

When the rectified signal voltage from the diode D1 becomes lower than the charging voltages of the capacitors C1 and C2, the charge in the capacitor C1 is discharged through the resistor R1, while the charge in the capacitor C2 is discharged through the resistors R2 and R1. The discharging time constant at this time is determined by the resistance value of the resistor R1 and the capacitance of the capacitor C1 and by the resistance values of the resistors R1 and R2 and the capacitance of the capacitor C2.

In this example of the prior art, the ripple quantity decreases with a slope of approximately 12 dB/oct as the signal frequency becomes higher.

In both of the above described known examples, however, the ripple quantity is considerably great with respect to the low frequency band of the input signal. Furthermore, the ripple quantity increases with the input signal level. Then, when the time constant is made amply large in order to reduce the ripple component particularly in the low frequency band, the response characteristic becomes poor.

Accordingly, the present invention overcomes these difficulties as will be apparent from the following description of the invention with respect to one embodiment thereof.

Figure 3:
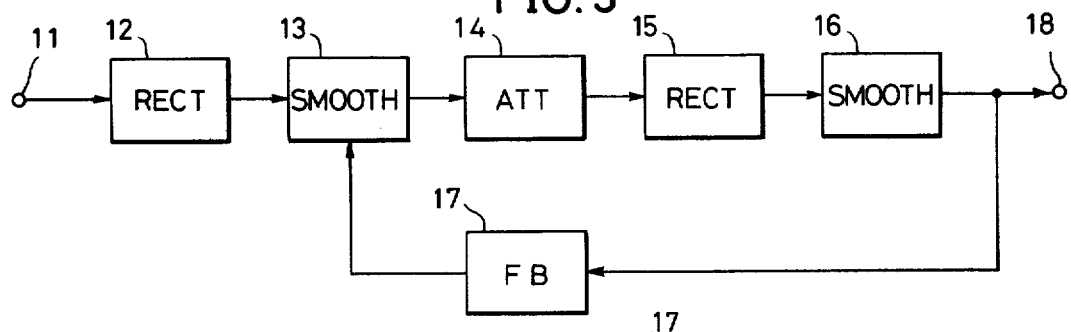
FIG. 3 is a block schematic diagram showing the essential organization of one embodiment of a rectifying and smoothing circuit according to the invention.

One embodiment of the rectifying and smoothing circuit of the invention is shown in the form of a block schematic diagram in FIG. 3. An Ac signal, for example, as indicated in FIG. 4(A), introduced through an input terminal 11 is half-wave rectified or full-wave rectified by a rectifier 12.

The pulsating voltage thus rectified is smoothed by a first smoothing circuit 13. The rectified and smoothed voltage thus produced as output by the smoothing circuit 13 has a rising and falling characteristic as indicated by curve I in FIG.4(B). In this case, the rising time constant of the curve I is determined by the values of the elements constituting the smoothing circuit 13 and the values of the internal resistance of the rectifier 12 and signal source resistor and other elements connected to the input terminal 11. The falling time constant is determined by the values of the elements constituting the smoothing circuit 13 and the impedance of a succeeding attenuator 14.

The output voltage of the smoothing circuit 13 is attenuated to a suitable level by the attenuator 14 and is thereafter supplied by way of a rectifier 15 to a second smoothing circuit 16, where it is smoothed. The output voltage of this second smoothing circuit 16 is caused to have, with respect to the characteristic of the input voltage introduced thereinto, a rising time constant determined by the impedance of the attenuator 14, the internal resistance of the rectifier 15, and the values of the elements constituting the smoothing circuit 16 and a falling time constant in accordance with the values of the elements constituting the smoothing circuit 16.

The output voltage of the second smoothing circuit 16, of a waveform as indicated by curve II in FIG. 4(B), is led out as a voltage rectified and smoothed by the rectifying and smoothing circuit 10 of the invention through an output terminal 18. At the same time, this output voltage is fed back through a feedback circuit 17 to the smoothing circuit 13. This feedback circuit 17 is nonconductive (open) in the time interval $t1$ to $t3$ in FIG.4(B) and is conductive after the time instant $t3$. This time $t3$ is the time instant at which the rectified and smoothed output voltage of the smoothing after a time instant $t2$ and becomes equal to the rectified and smoothed output voltage E2 of the smoothing circuit 16. Consequently, the feedback circuit 17 becomes conductive when the output voltage of the smoothing circuit 13 becomes lower than the output voltage of the smoothing circuit 16. Accordingly, the time interval $t2$ to $t3$ corresponds to a characteristic wherein the output voltage of the smoothing circuit 16 is in a self-held state at a voltage E2. Therefore, a rectified and smoothed voltage of low ripple content is obtained from the smoothing circuit 16.

After the time instant $t3$, the output voltage of the smoothing circuit 16 exhibits a falling characteristic which results from the addition of the falling characteristic due to the circuit elements of the smoothing circuit 16 to the falling characteristic of the output voltage of the smoothing circuit 13. Therefore, when the time constant of the circuit elements of the smoothing circuit 16 is smaller in comparison with the falling time constant of the output voltage of the smoothing circuit 13, the falling characteristic of the curve II after the time instant $t3$ becomes substantially equal to the falling characteristic of the curve I.

In the case where the attenuator 14 is of a circuit organization showing a differentiation characteristic, the characteristic of the rising and falling time constants of this attenuator 14 becomes as indicated by curve III in FIG.4(C). More specifically, when a voltage E1 is introduced as input into the attenuator 14, a differentiated pulse with a peak level E1 is obtained since the attenuator has a differentiation characteristic. The output voltage of the attenuator 14 further shows a characteristic wherein it converges toward the voltage E2, and, at the time instant $t2$, the output voltage exhibits a falling characteristic wherein it instantaneously becomes zero.

By selecting the differentiation time constant of this attenuator 14 at an appropriate value, the rise of the voltage of the above mentioned curve II can be made more rapid without influencing the falling characteristic. Furthermore, in the case where the differentiation time constant is caused to have a falling characteristic corresponding to the falling characteristic of the curve II, it is also possible to obtain an instantaneously rising characteristic as indicated by curve IV in FIG. 4(C).

Figure 5:
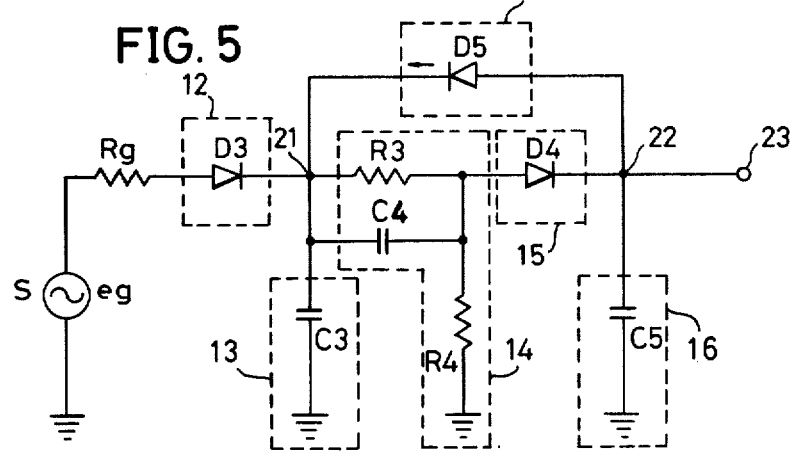
FIG. 5 is a circuit diagram of one embodiment of a specific electrical circuit in concrete form of the rectifying and smoothing circuit according to the invention.

Next, the invention will be described with respect to an embodiment of specific electrical circuit organization in concrete form as shown in FIG. 5 of the rectifying and smoothing circuit of the invention. In FIG. 5, circuit parts corresponding to blocks in FIG. 3 are enclosed within respective broken-line enclosures and designated by like reference numerals.

A signal source S is connected by way of a signal source resistor Rg to the anode of a rectifying diode D3. Between a junction 21 on the cathode side of the diode D3 and ground is connected a smoothing capacitor C3. The junction 21 is connected by way of a resistor R3 to the anode of a rectifying diode D4. A resistor R4 is connected between ground and a junction between the resistor R3 and the diode D4. A speed-up capacitor C4 is connected in parallel with the resistor R3.

A smoothing capacitor C5 is connected between a junction 22 on the cathode side of the diode D4 and ground. A feedback diode D5 is connected between the junctions 22 and 21, the forward direction of this diode D5 being from the junction 22 toward the junction 21.

An input signal eg from the signal source S is half-wave rectified by the rectifying diode D3. This signal thus rectified and having a waveform as indicated by broken line a in FIG. 6(A) is supplied respectively to the capacitors C3 and C4 and, at the same time, through the resistor R3 and the diode D4 to the capacitor C5 and is thereby charged respectively into the capacitors C3, C4, and C5. The charging time constant at this time is determined by the resistance of the signal source resistor $R_g$, the internal resistance $R_{d3}$ of the diode D3, the capacitance C3 of the capacitor C3, the resistance R3 and R4 of the resistors R3 and R4, the internal resistance $R_{d4}$ of the diode D4, and the capacitances C4 and C5 of the capacitors C4 and C5.

When the level of the signal from the diode D3 at the junction 21 becomes lower than the voltage between the terminals of the capacitor C3, the charge in the capacitor C3 is discharged in accordance with a time constant equal to the product of the capacitance C3 of the capacitor C3 and the sum of the resistances R3 and R4 of the resistors R3 and R4, that is, $C3(R3 + R4)$. As a consequence, the voltage at the junction 21 decreases as indicated by the full line $b$ in FIG. 6(A). During this time, the voltage of the capacitor C5 at the junction 22 as indicated by curve $c$ in FIG. 6(B) is sustained in self-held state since the diodes D4 and D5 are both being inversely biased. Consequently, the voltage at the junction 22 is substantially constant as indicated by curve $c$ in the time interval $ta$ in FIG. 6(B). Here, the period $ta$ can be expressed as follows when the speed-up capacitor C4 is neglected.

$$ta = -C3(R3 + R4) \ln \frac{R2}{R1 + R2}.$$

Then, when the voltage of the junction 21 becomes lower than the voltage of the capacitor C5, the diode D5 assumes its conductive state. Consequently, the accumulated charge in the capacitor C5 is discharged with a specific time constant through the diode D5 and the resistors R3 and R4. As a result of this discharge, the voltage of the capacitor C5 decreases as indicated by the curve $c$ in the interval $tb$ in FIG. 6(B). In this connection, the waveform of the discharge current of the capacitor C5 at the cathode of the diode D5 is indicated by curve $d$ in FIG. 6(C).

Between the periods $ta$ and $tb$, the capacitor C3 continues to discharge, but when the output rectified signal of the diode D3 as indicated by $a$ in FIG. 6(A) becomes higher than the voltage between the terminals of the capacitor C3, the capacitor C3 is again charged in accordance with a time constant determined by the product of the capacitance of the capacitor C3 and the sum of the resistance of the signal source resistor $Rg$ and the internal resistance $R_{d3}$ of the diode D3. At this time, the diode D5 is inversely biased and becomes "OFF", and, until the potential of the junction between the resistors R3 and R4 increases to the residual potential of the junction 22 of the capacitor C5 and the diode D4 is rendered "ON", the voltage of the junction 22 of the capacitor C5 is sustained in self-held state as indicated by curve $c$ in the period $tc$ in FIG. 6(B).

Thereafter, the above described operation is repeated, whereby a rectified and smoothed voltage of very low ripple content as indicated by curve $c$ in FIG. 6(B) is obtained from the output terminal 23.

In this connection, it is to be noted that the circuit comprising the capacitor C4 and the resistors R3 and R4 constitutes a speed-up circuit. The holding period $ta$ in FIG. 6(B) is determined by the voltage division ratio due to the resistors R3 and R4. Therefore, by increasing the voltage division ratio, the voltage of the junction 22 decreases, but the holding period indicated by $ta$ is lengthened, and for this reason, the response characteristic of the recovering time can be selected as desired. For example, in the case where the voltage division ratio of the resistors R3 and R4 is small, the falling characteristic of the voltage at the junction 22 becomes a characteristic of attenuation substantially an expotential function as indicated by full line V in FIG. 4(D). On the other hand, in the case where the voltage division ratio of the resistors R3 and R4 is large, the holding time of the voltage at the junction 22 becomes elongated, and the falling characteristic thereof becomes a characteristic resulting from a combination of the characteristic of the internal resistance $R_{d5}$ of the diode D5 with the holding characteristic as indicated by broken line V1 in FIG. 4(D).

For the diodes D3, D4, and D5 in the circuit shown in FIG. 5, germanium diodes or silicon diodes may be used. However, since the rising characteristics and the internal resistances of these two kinds of diodes differ, these differences must be considered in the circuit design.

Figure 7:
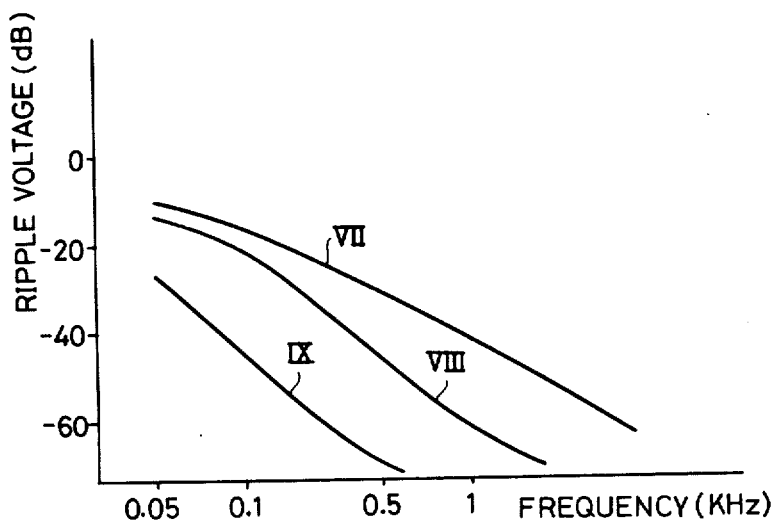
FIG. 7 is a graph indicating ripple voltage characteristics with respect to frequency of rectifying and smoothing circuits of the prior art and of the rectifying and smoothing circuit of the invention.

FIG. 7 indicates ripple voltage characteristics with respect to frequency in the case where the input signal level is 0 (zero) dB. In this graph, curves VII and VII respectively indicate the frequency characteristics of ripple voltage of the frequency characteristic of ripple voltage of the circuit of the present invention shown in FIG. 5. As is apparent from this graph, the ripple voltage in rectified and smoothed voltage produced as output by the circuit of the invention is lower by more than approximately 20 dB than that of a circuit of the prior art.

Figure 8:
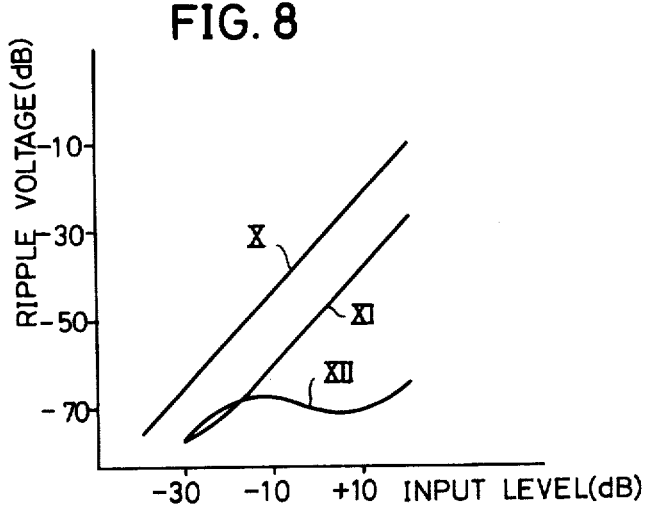
FIG. 8 is a graph indicating ripple voltage characteristics with respect to input level of rectifying and smoothing circuits of the prior art and of the rectifying and smoothing circuit of the invention.

In the addition, ripple voltage characteristics with respect to input signal level in the case where the input signal frequency is 500 Hz are indicated in FIG. 8. In FIG. 8, curves X and XI respectively indicate the relationships between input signal level and ripple voltage of the known circuits shown in FIGS. 1 and 2. Curve XII indicates the same relationship of the circuit of the present invention illustrated in FIG. 5. As is apparent from this graph, in the circuit of the invention, there is almost no increase, relatively speaking, in the ripple voltage when the input signal level increases.

Because of the highly desirable characteristics of the rectifying and smoothing circuit of the invention as described above, it is suitable for a wide range of applications as a circuit for obtaining control voltage for automatic gain control in circuits such as audio limiters, automatic noise reduction systems, and automatic gain control circuits.

Further, this invention is not limited to these embodiments but various variations and modifications may be made without departing from the scope and spirit of the invention.

What is claimed is:

1. A rectifying and smoothing circuit comprising:
    a first rectifier for rectifying an input signal voltage;
    a first smoothing circuit for smoothing the output voltage of the first rectifier;
    an attenuation circuit for attenuating the output voltage of the first smoothing circuit;
    a second rectifier for rectifying voltage passing through the attenuation circuit;
    a second smoothing circuit for smoothing the output voltage of the second rectifier; and
    a feedback circuit for feeding back to the output voltage of the second smoothing circuit to the first smoothing circuit,
    said second smoothing circuit, after being charged at a specific voltage, being held at said charging voltage until the output voltage of the first smoothing circuit becomes less than the output voltage of the second smoothing circuit, the output voltage of the second smoothing circuit being derived as the output of the rectifying and smoothing circuit.

2. A rectifying and smoothing circuit as claimed in claim 1 in which the attenuation circuit is of a circuit organization wherein the output voltage of the second smoothing circuit is voltage divided and, at the same time, is differentiated.

3. A rectifying and smoothing circuit comprising:
a first rectifying diode for rectifying an input signal voltage;
a first smoothing capacitor charged by the output voltage of the first rectifying diode;
first and second resistors adapted to pass the discharge current of the first smoothing capacitor and being connected together at a junction;
a second rectifying diode connected to said junction and rectifying a voltage divided by the first and second resistors;
a second smoothing capacitor charged by the output voltage of the second rectifying diode; and
a third diode connecting the second smoothing capacitor and the first smoothing capacitor,
said third diode being nonconductive during a period wherein the voltage of the first smoothing capacitor is higher then the voltage of the second smoothing capacitor and causing the second smoothing capacitor to hold the voltage thereof without discharging.

4. A rectifying and smoothing circuit as claimed in claim 3 which further comprises a third capacitor connected in parallel with the first resistor, said third capacitor constituting a differentiation circuit together with the second capacitor.

* * * * *